June 7, 1927.
C. R. SHORT
RESILIENT CONNECTER
Filed July 2, 1925
1,631,228
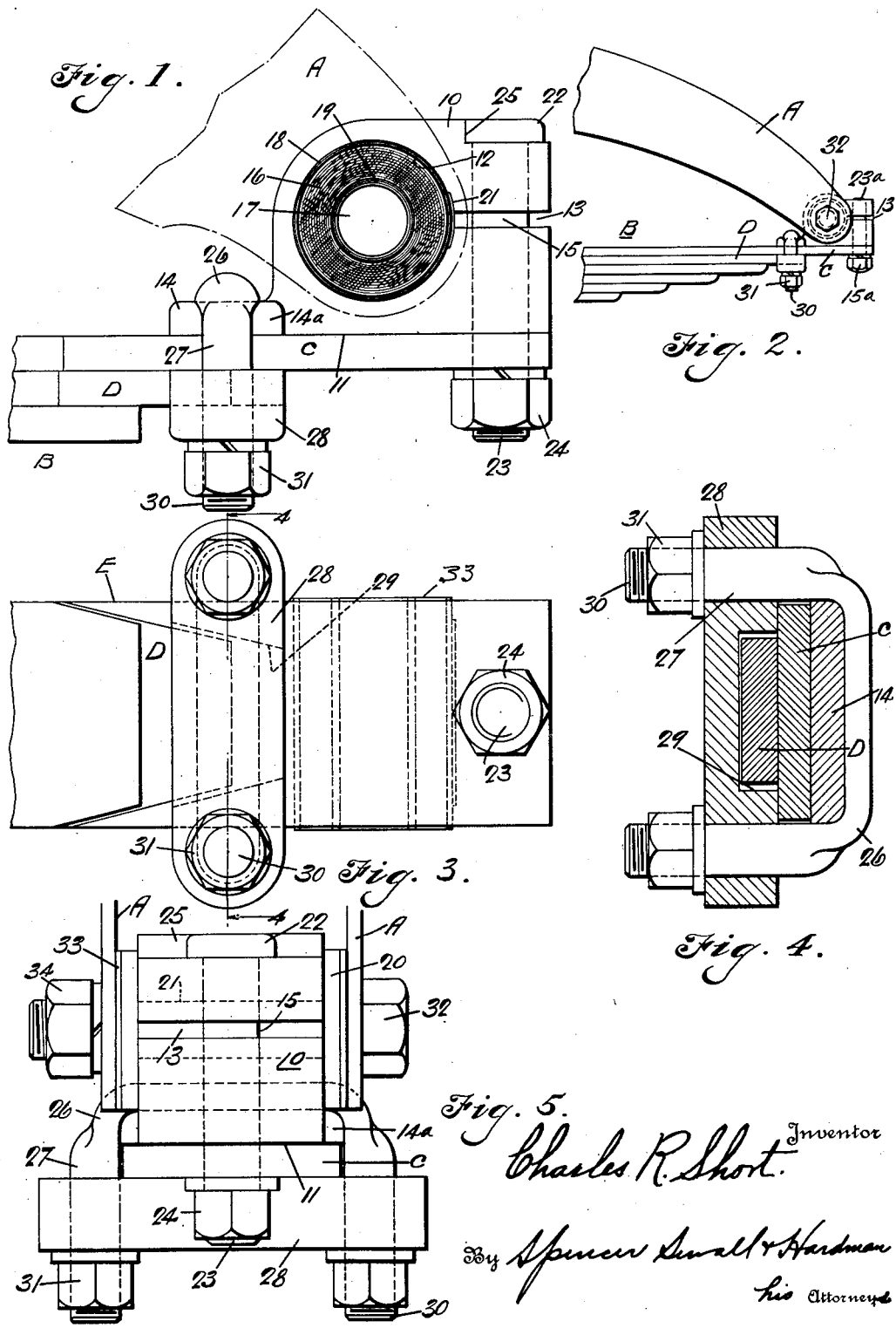

Patented June 7, 1927.

1,631,228

UNITED STATES PATENT OFFICE.

CHARLES R. SHORT, OF DAYTON, OHIO, ASSIGNOR TO GENERAL MOTORS RESEARCH CORPORATION, OF DAYTON, OHIO, A CORPORATION OF DELAWARE.

RESILIENT CONNECTER.

Application filed July 2, 1925. Serial No. 41,113.

This invention relates to resilient connecters particularly adapted to be interposed between two members designed to have a slight angular movement with respect to each other. It is particularly applicable as a spring connection in vehicles.

An object of the invention is to avoid contact between metallic parts in a joint of this type, all necessary movements being permitted by the resiliency of a connecting body, thereby avoiding the necessity of lubrication and preventing wear and rattling of the joint.

Other objects are to cushion the right-line movements, to render the assemblage of the parts simple, and to secure the resilient element readily and firmly to the members that are to be connected by it.

The invention consists in the combinations described in the specification, illustrated in the drawings, and defined in the appended claims.

In the drawings, in which like reference characters indicate like parts throughout the several views;

Fig. 1 is an elevation of the improved connecter mounted on the end of a leaf spring and adapted to be connected to a vehicle frame sill;

Fig. 2 is an elevation showing the assemblage of a resilient connecter of this invention, with one end of a leaf spring and one end of a vehicle frame sill;

Fig. 3 is a view of the structure shown in Fig. 1, viewed from beneath;

Fig. 4 is a section on the line 4—4 of Fig. 3, a clip or staple bolt being shown in full lines; and Fig. 5 is an end elevation of the connecter with assembled parts connected by it.

The connecter is shown in Fig. 2, joining one end of a vehicle sill A to one end of a leaf spring B, said leaf spring comprising a plurality of leaves, of which the long leaf C and several of the shorter leaves are illustrated.

The connecter comprises a split clamp 10, of steel or other suitable elastic metal, adapted to confine a body of rubber or like resilient deformable substance, said clamp having a base surface 11, a bore or other opening 12, and a gap or kerf 13, extending from the bore to the exterior. In the form shown, the gap or kerf lies substantially parallel with the base surface 11. A ledge 14 extends outward from the lower portion of the body of said clamp 10, on the side opposite the kerf, its lower surface being flush with the base surface 11. The said ledge 14 is a little wider than the main body of the clamp 10, for a purpose that will presently appear. Clamp 10 is provided with a hole intersecting the gap or kerf 13, for the passage of a clamping bolt 15, whereby the split clamp may be tightened in order to clamp, more or less firmly, a resilient body seated within the bore.

The yieldingly functioning portion of the connecter consists of a resilient body comprising a mass of tough, elastic rubber 16, formed in cross-section to fit snugly within the bore 12. Said body is provided with a hole 17, and preferably, although not necessarily, has a layer of hard rubber 18 on its exterior, and a layer of hard rubber 19 on its interior surface. The resilient body is of a length somewhat greater than the width of the clamp 10, so that the ends 20 thereof project beyond the sides of said clamp. A thin curved shim of metal 21, bridges the kerf 13 between the resilient body and the inner wall or bore of the clamp, so that in setting up the clamp and thereby deforming the rubber the latter will not protrude into the kerf and be pinched by the clamp.

In the embodiment illustrated, the connecter is secured to one end of the long leaf C of a leaf spring B. Bolt 15 may serve the double function of a securing member for securing the connecter to the spring, and of a member for adjusting or tightening the clamp 10. As shown in Fig. 1, the bolt 15 has a head 22 engaging one side of the clamp, and a threaded end 23 on which a nut 24 is screwed and by the rotation of which the clamp may be tightened and secured. The head 22 of bolt 15 may have a flattened side engaging a shoulder 25 on the clamp, so that the bolt will not rotate while the nut is being tightened.

Instead of using a bolt and nut to tighten the clamp and secure it to the spring, a machine bolt may be used, as indicated in Fig. 2, wherein 15ª indicates a machine bolt having a threaded end 23ª screwed into threads suitably cut in the clamp at one side only of the gap or kerf 13.

That end of the clamp 10 which is opposite the kerf 13, or on the opposite side of the center of the resilient body, is clamped to the spring leaf C by means of a clip or staple bolt 26, the yoke of which engages over the ledge 14, while the limbs 27 pass through holes formed in the ends of a clamping plate 28, which engages the underside of leaf C, the upper side of said leaf being in engagement with the base surface 11. As shown in Figs. 3 and 4, clamping plate 28 is cut away at 29 on the side adjacent spring leaf C, so as to permit entrance of the end of spring leaf D, and not interfere with its slipping freely during the flexing of the spring. The ends of limbs 27 are threaded as at 30, the threaded ends being engaged by nuts 31, whereby ledge 14 and spring leaf C may be rigidly clamped together between the yoke portion of the staple bolt and the clamp plate 28. The lateral projections 14ª of ledge 14, engage the inner faces of limbs 27, and as the spring leaf C is of approximately the same width, lateral movement of the clamp relative to the spring leaf is prevented.

The connecter is joined to the sill A, or other member, by means of a bolt, or other internal element 32, which is driven through the hole 17 of the resilient body. The bolt may be slightly roughened, if desired, so as to give increased frictional hold thereof within the hole of said body. In the form shown, the end of sill A is provided with two cheek members, each of which engages a washer 33, bearing against the end of the elastic body. By means of a nut 34, threaded upon one end of said bolt 32, the bolt may be retained in place.

It will be understood that suitable lock washers are used in connection with the nuts and bolts, wherever necessary, to prevent loosening of the nuts.

By the construction shown, a resilient connecter of the kind described may be quickly and easily assembled to connect any two desired members. The resilient connecter may be inserted into the bore, or other opening provided for it, in the clamp 10, the shim 21 inserted, the parts to be connected brought together, and the bolt 32 forced in place and secured by the nut 34. The clamp may then be tightened so that the friction between the inner surface of the clamp and the outer surface of the resilient body; and the friction between the bolt, or internal element 32, and the inner surface of the elastic body, will be greater within the limits of relative angular movement between said internal element, than the resistance of the resilient mass 16 to torsion; and will be greater also than the resistance to deformation of the exposed ends 20 of said mass.

The layers 18 and 19, when used, may be of different degrees of hardness, as desired. The hardness need not be such as to prevent deformation of the ends 20, or, if desired, the hard layers need not extend into the ends 20.

The rubber body can be readily made by anyone skilled in the art of compounding rubber. Where the inner and outer layers are of hard rubber, of course, layers of a stiffer compound will be applied to the mass before curing.

While the form of embodiment of the invention as herein disclosed, constitutes a preferred form, it is to be understood that other forms might be adopted, all coming within the scope of the claims which follow.

What is claimed is as follows:

1. Means for connecting two members resiliently, comprising an adjustable clamp, a body of elastic deformable substance surrounded by said clamp, said body having a hole therein, an element engaged in said hole, and members respectively secured non-rotatively to said clamp and said element.

2. Means for connecting two members resiliently, comprising an adjustable clamp, a body of elastic deformable material surrounded by said clamp, said body having a hole therein and a layer of less deformable material integrally united to the elastic deformable material lining said hole, an element engaged in said hole, and members respectively secured non-rotatively to said clamp and said element.

3. Means for connecting two members resiliently, comprising an adjustable clamp, a body of elastic deformable material having an outer layer of less deformable material surrounded by said clamp, said body having a hole therein, an element engaged in said hole, and members respectively secured non-rotatively to said clamp and said element.

4. Means for connecting two members resiliently, comprising a split elastic clamp having an opening therein, a body of elastic deformable material seated in said opening, said body having a hole therein, an element engaged in said hole, means for tightening said clamp, and members respectively secured non-rotatively to said clamp and said element.

5. Means for connecting two members resiliently, comprising a split elastic clamp having an opening therein, a body of elastic deformable material seated in said opening, said body having a hole therein, a shim bridging the gap of the split clamp and disposed between the inner wall of the clamp and the body of deformable material, an element engaged in said hole, means for tightening said clamp, and members respectively secured non-rotatively to said clamp and said element.

6. Means for connecting two members resiliently, comprising a split elastic clamp having an opening therein, a body of elastic deformable material seated in said opening, said body having a hole therein, an element engaged in said hole, means for tightening said clamp, a bolt for closing said clamp, members respectively secured non-rotatively to said clamp and said element, said bolt for tightening said clamp serving as a means for securing it to one of said members.

7. Means for connecting a leaf spring or the like to a vehicle body frame, comprising a split elastic clamp, a body of elastic deformable material surrounded by said clamp, said body having a hole therein, a leaf spring, a bolt securing said clamp to one end of said spring and also serving to tighten said clamp, a staple bolt engaging said clamp, a clamping bar and a spring leaf disposed between said clamping bar and said clamp member, and nuts for tightening said staple bolt.

8. Means for connecting a leaf spring or the like to a vehicle body frame, comprising a split elastic clamp, a body of elastic deformable material surrounded by said clamp, said body having a hole therein, a leaf spring, a bolt securing said clamp to one end of said spring and also serving to tighten said clamp, a staple bolt engaging said clamp, a clamping bar having a cut-away portion on one face to accommodate one end of an adjacent spring leaf, and nuts for tightening said staple bolt.

9. Means for connecting two members resiliently comprising a body of elastic deformable substance, a confining element surrounding said body and capable of adjustment to deform it, and a second element non-rotatably engaging said body whereby said elements may move angularly with respect to each other by reason of the torsional resilience of the body only.

In testimony whereof I hereto affix my signature.

CHARLES R. SHORT.